Figure 1:
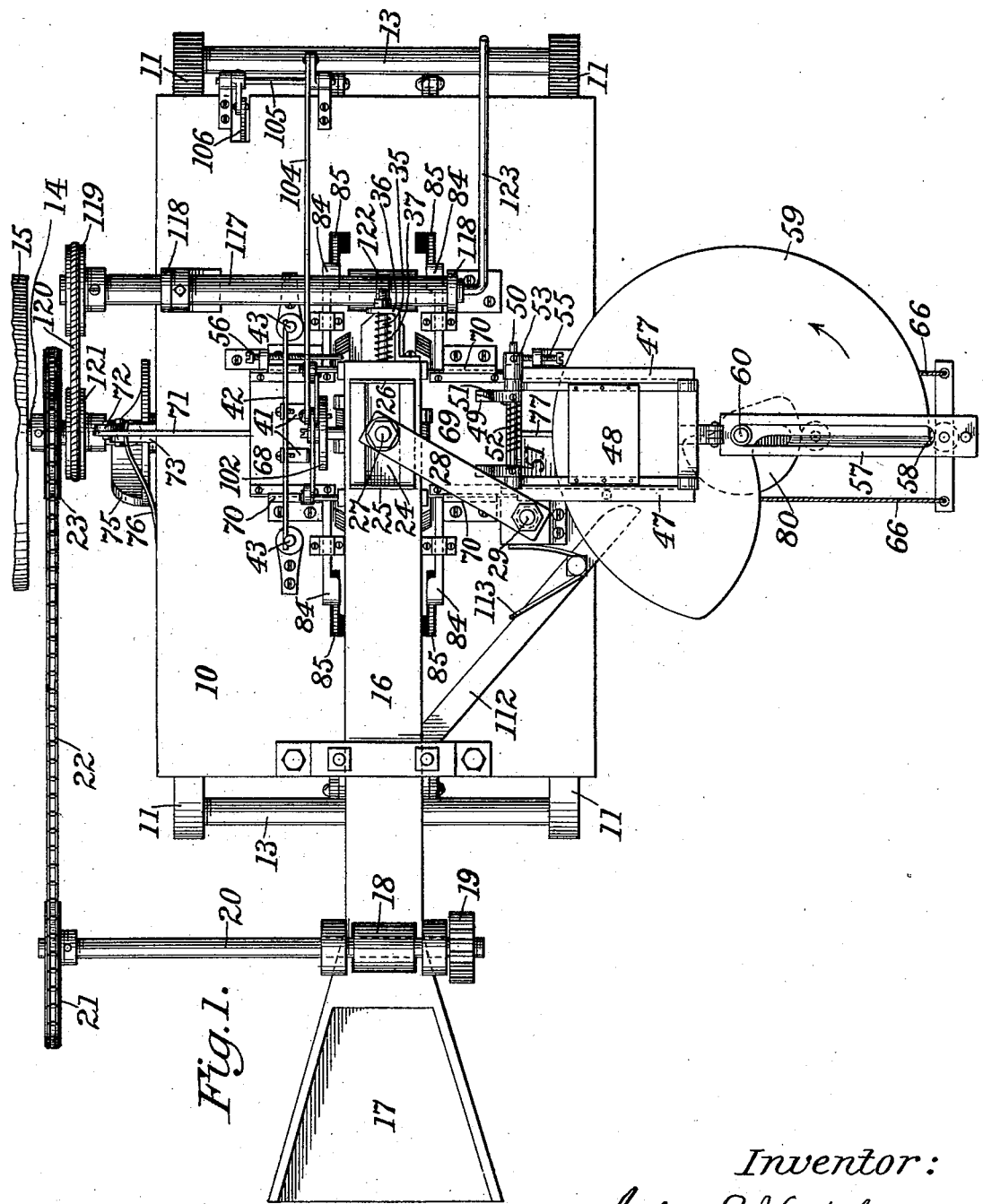

(No Model.) 7 Sheets—Sheet 1.

J. S. VOITEK.
PACKAGING MACHINE.

No. 513,692. Patented Jan. 30, 1894.

Attest:
A. N. Jesbera
A. Tidder

Inventor:
John S. Voitek
by William B. Greeley
Atty.

(No Model.) 7 Sheets—Sheet 2.
J. S. VOITEK.
PACKAGING MACHINE.

No. 513,692. Patented Jan. 30, 1894.

Attest:
A. N. Jesbera.
A. Fidder.

Inventor:
John S. Voitek
by William B. Greeley
Atty.

(No Model.)  
7 Sheets—Sheet 3.

J. S. VOITEK.
PACKAGING MACHINE.

No. 513,692.  Patented Jan. 30, 1894.

Attest:  
A. N. Jesbera.  
A. Stidder.

Inventor:  
John S. Voitek  
by William B. Greeley  
Att'y.

(No Model.)

J. S. VOITEK.
PACKAGING MACHINE.

No. 513,692.

Patented Jan. 30, 1894.

7 Sheets—Sheet 5.

Attest:
A. N. Jesbera.
A. Shidder.

Inventor:
John S. Voitek
by William B. Greeley
Atty.

(No Model.) 7 Sheets—Sheet 6.
J. S. VOITEK.
PACKAGING MACHINE.
No. 513,692. Patented Jan. 30, 1894.
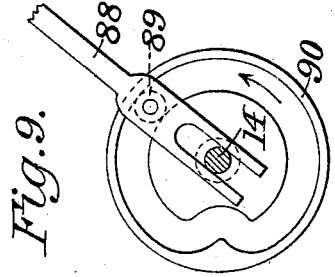
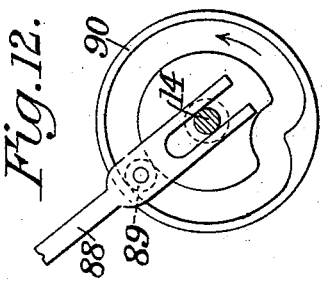
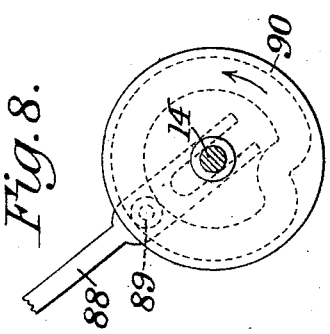
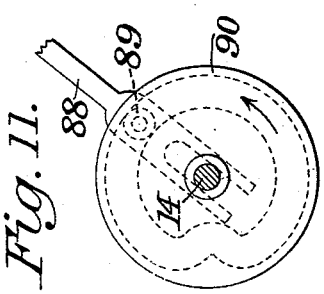
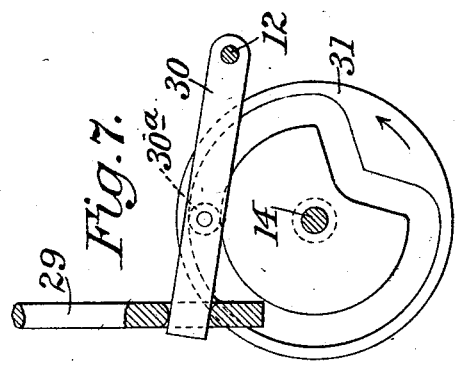
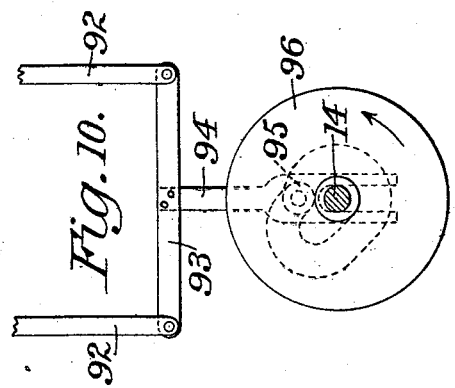
Attest:
A. N. Jesbera.
A. Gridden.
Inventor:
John S. Voitek
by William B. Greeley
Att'y.

(No Model.)　　　　　J. S. VOITEK.　　　7 Sheets—Sheet 7.
PACKAGING MACHINE.
No. 513,692.　　　　　　　　Patented Jan. 30, 1894.
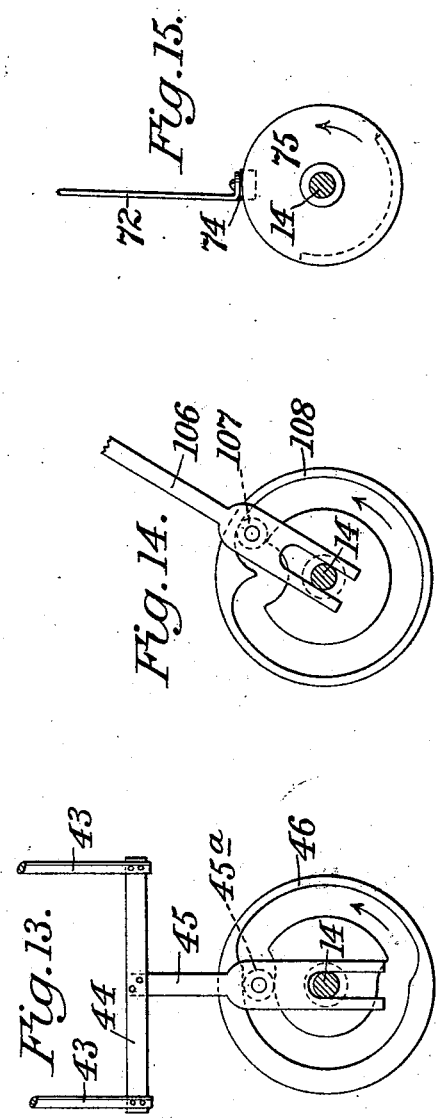
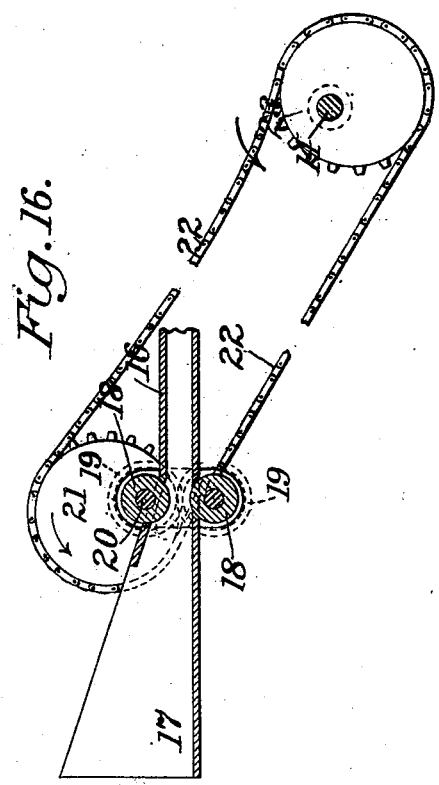

United States Patent Office.

JOHN S. VOITEK, OF NEW YORK, N. Y.

PACKAGING-MACHINE.

SPECIFICATION forming part of Letters Patent No. 513,692, dated January 30, 1894.

Application filed February 27, 1893. Serial No. 463,796. (No model.)

*To all whom it may concern:*

Be it known that I, JOHN S. VOITEK, a citizen of the United States, and a resident of New York, in the county and State of New York, have invented certain new and useful Improvements in Packaging-Machines; and I do hereby declare that the following is a full and exact description thereof, reference being had to the accompanying drawings, and to the figures of reference marked thereon, making a part of this specification.

The object of this invention is to provide a machine for forming cakes of tobacco or other substance and inclosing them in a wrapper of paper, tin-foil, or other material, and particularly to produce such a machine which shall do its work not only efficiently and completely but with great rapidity.

The complete machine includes the following instrumentalities, to wit: a feeding mechanism which forces the substance operated upon to the mechanisms which form the cake, inclose it in a wrapper and eject it from the machine; a cake forming mechanism which forms the substance operated upon into compact and solid cakes of a uniform size; a wrapper feeding mechanism which places the wrappers successively in the proper position to receive the cake from the forming mechanism; a wrapper mechanism which folds the wrapper neatly about each cake; an ejector mechanism which throws the package out from the wrapping mechanism; and sealing devices to seal the wrapper about the cake. One or more of these instrumentalities may be dispensed with according to the particular work to be performed. Thus, the wrapping mechanism and ejecting mechanism may be used to operate upon cakes previously formed and the sealing devices may also be omitted without affecting the operation of the other mechanisms, although in the complete machine all of these instrumentalities co-operate in the production of a common result.

Figure 2:
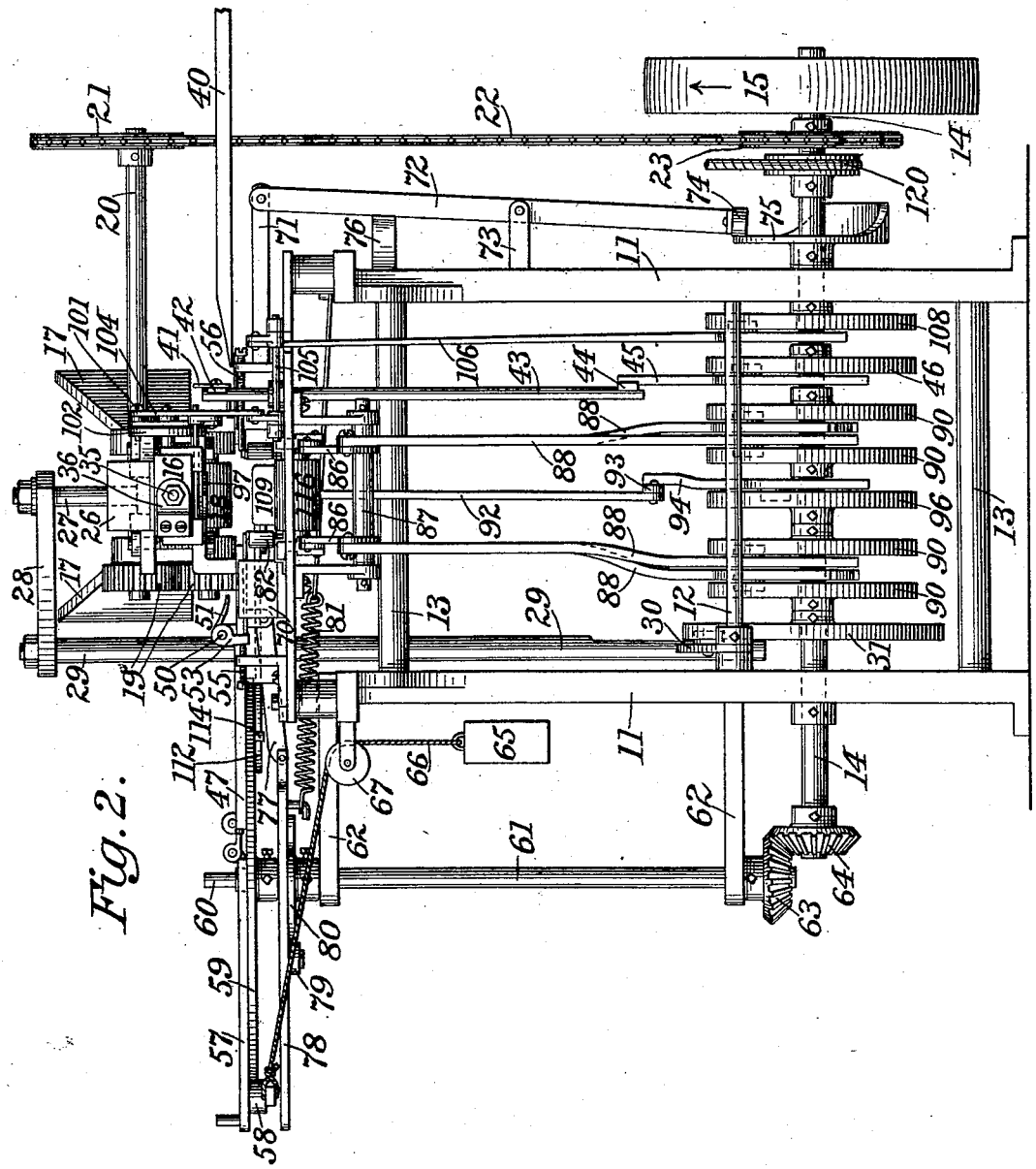
Figures 3, 4:
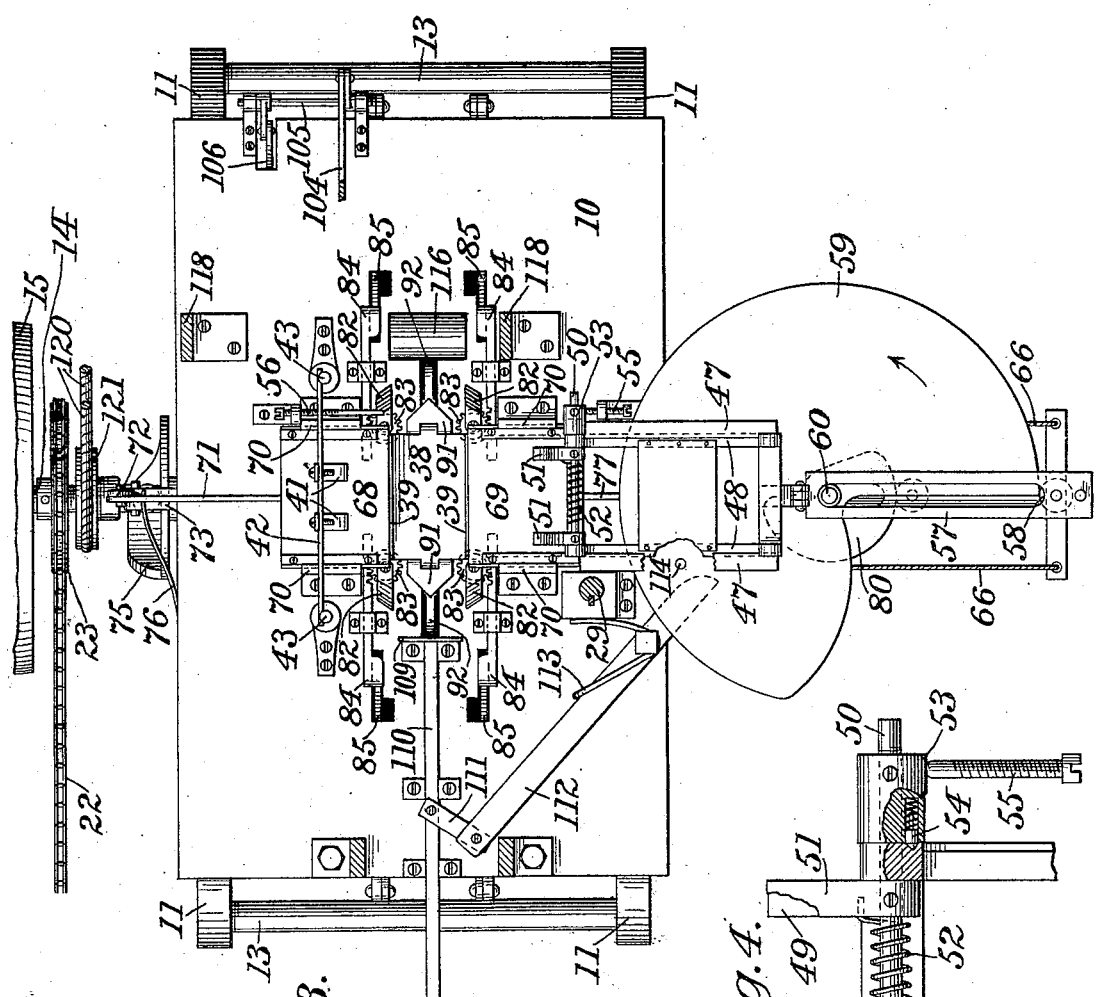
Figure 5:
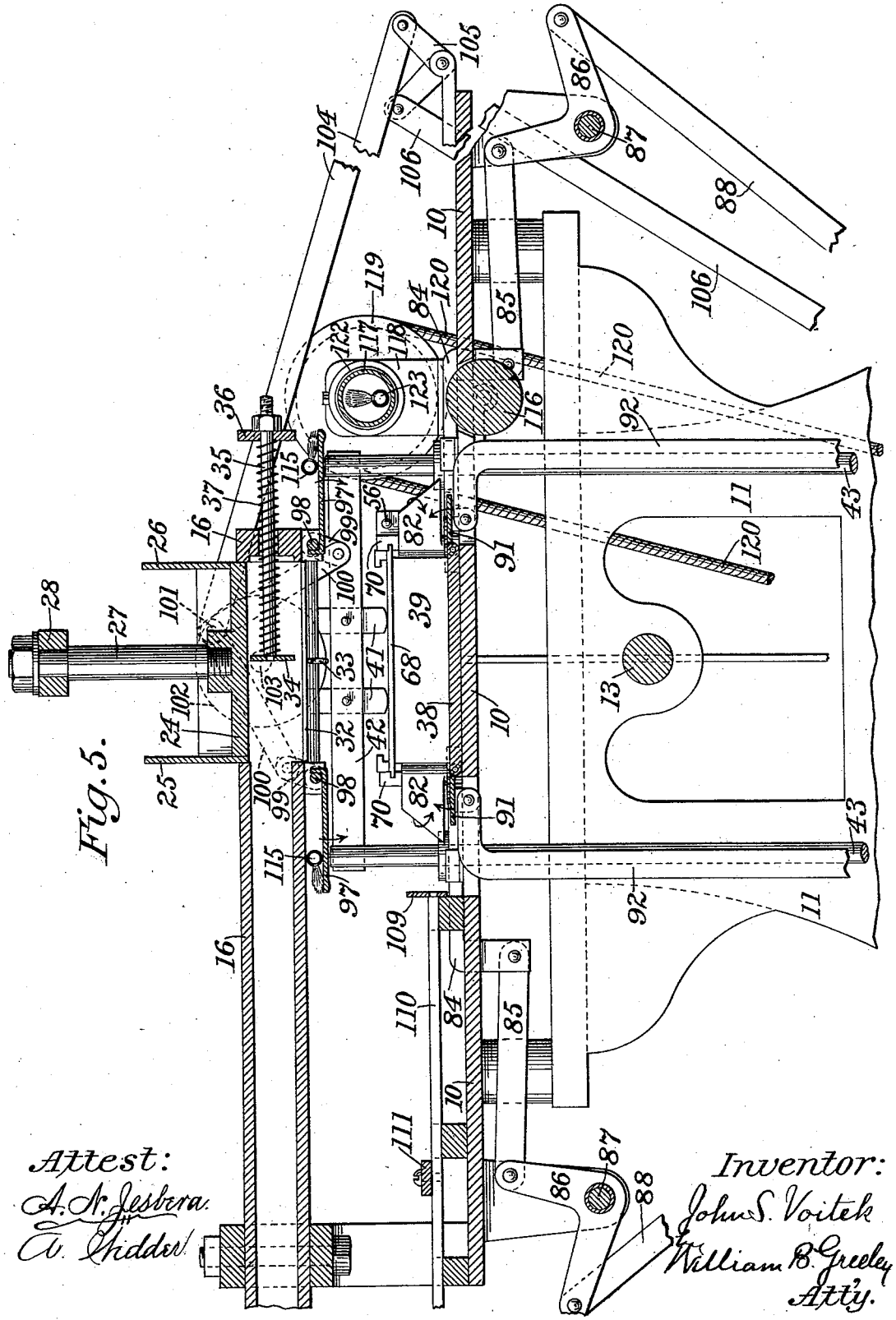
Figure 6:
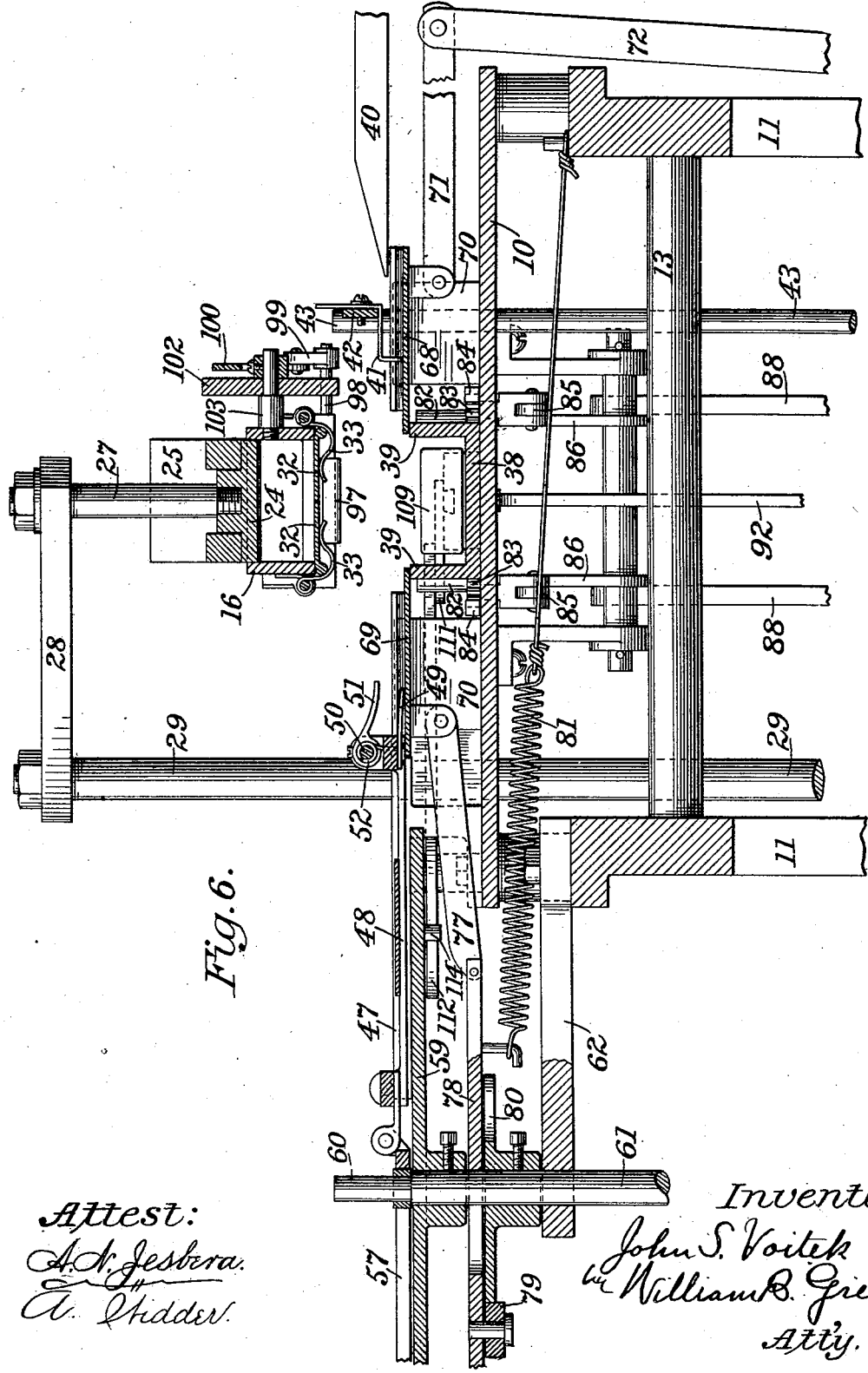

In the drawings, wherein a machine embodying the invention in a practical and desirable form is represented in detail: Figure 1 is a plan view of the entire machine, with the feeding table and two gas pipes omitted. Fig. 2 is an end elevation of the machine as seen from the right of Fig. 1, with the upper sealing roller and its supports omitted to show parts in the back-ground. Fig. 3 is a plan view similar to Fig. 1 but with the feeding chute and its associated parts being omitted to show underlying parts. Fig. 4 is a detail plan view, partly broken out, of a portion of the wrapper feeding mechanism. Fig. 5 is a vertical longitudinal section through the center of the upper part of the machine, the scale being larger than that of Figs. 1, 2 and 3, and parts being broken away. Fig. 6 is a vertical, transverse section through the center of the upper part of the machine on the same scale as that of Fig. 5, parts being broken away and parts beyond the section plane being omitted. Figs. 7, 8, 9, 10, 11, 12, 13, 14 and 15 are side views of the several actuating cams with a portion of the connections in each case. Fig. 16 is a detail view partly in longitudinal section and partly broken out, of the feeding mechanism.

The various working parts of the machine, as shown in the drawings, are supported by a suitable frame which comprises a bed-plate 10 and standards 11, the frame being properly braced by tie-rods 13. In the lower portions of the standards 11 is journaled the main shaft 14 which may be fitted with a band-pulley 15 and from which the several moving parts of the machine derive power. The general arrangement of the machine having been referred to briefly, the several instrumentalities above mentioned will now be described severally and in detail and the relation of each to the others will be made clear.

The feeding mechanism is shown in Figs. 1, 2 and 16. It comprises a tube or chute 16 having at its outer end a flaring mouth 17, through which tobacco or other substance to be operated upon is fed to the chute. Near the same end of the chute two rolls 18 are journaled in bearings carried by the chute and are driven in a direction to force the tobacco or other substance forward into and through the chute. The shafts of the two rolls bear intermeshing pinions 19, 19, to insure the equal movement of the two, and the extended shaft 20 of one of the rolls has fixed thereon an eccentric chain wheel 21 which is driven by a chain 22 from a corresponding chain-wheel 23 on the main shaft 14. The purpose of the eccentric gearing is to drive the rolls 18, 18, with varying speed during each rotation of the shaft 14 so that during certain operations of other parts of the machine the feed shall be reduced to a minimum while at other times the tobacco or other substance is forced forward rapidly. The tube or chute 16 conducts the material directly to the cake-forming mechanism, the cake being formed in fact in the inner end of the chute. This mechanism is shown in detail in Figs. 1, 2, 3, 6 and 7. The top and bottom plates of the chute are formed with opposite openings, see particularly Figs. 5 and 6, through which a plunger 24 is adapted to move vertically. As shown the plunger is at its highest point and in order that it may keep the chute closed as it moves down it is provided with a guard-plate 25 at one end and at the other end with a guard-plate 26 to prevent the spring-pressed plate 34, hereinafter referred to, from slipping over the top of the plunger when it is down. The plunger is carried by a depending stem 27 which is fixed to one end of an arm 28. The latter is rigidly fixed to the upper end of a rod 29 which is mounted to move vertically in suitable bearings and is reciprocated at the proper time by a cam 31 (see Fig. 7) mounted upon the shaft 14. As indicated in Fig. 7 the rod 29 is supported by the free end of a lever 30 which is fulcrumed upon a tie-rod and has a roller stud 30ª which enters the groove of the cam 31. The opening in the bottom of the chute 16 is closed normally by leaves 32, 32, which are hinged to the sides of the chute and are normally sustained in position to close the opening by springs 33 which yield to permit the cake to be severed from the material in the chute and the thrust downward by the descent of the plunger. In order to make the cakes compact and as near as possible of uniform weight a plate 34 is mounted upon the end of a rod 35 which moves freely through the closed end of the chute and through a bracket-arm 36. Between the plate 34 and the bracket-arm 36 a light spring 37 surrounds the rods 35 and normally throws the plate 34 forward into the position shown in Fig. 5. As the space between the leaves 32, 32, and the plunger is filled by the material the plate 34 is thrust back but offers sufficient resistance to insure the filling of the space solidly.

Before the plunger 24 makes its downward movement to force the cake from the chute a wrapper must be placed beneath the cake to receive it. The mechanism for placing the wrapper in position will now be described, it being premised that the action of the cake forming mechanism is not completed until the cake has been thrust down and compressed into a box which is fixed to the bed-plate in line with the plunger and has a fixed bottom 38, fixed sides 39, and open ends and top. The wrappers may be placed upon a feed table 40, which is shown in part in Figs. 2 and 6 only and has been omitted from the other figures to show other parts beneath it. From the table the wrappers are fed by the operator to a plate 68 which might be a fixed plate, but as the plate 68 is in a suitable position to receive the wrappers, though movable and having another function it may be utilized for this purpose also. The wrappers are pushed forward one at a time upon the plate 68, by the attendant, until they are stopped by fingers 41, 41, which are carried by a bar 42, the latter being fixed to a rod or rods 43. Normally the tips of the fingers 41, 41, rest upon the plate 68 and prevent the wrappers from slipping forward, but they must be raised to free each wrapper as it is withdrawn by the mechanism shortly to be described. For this purpose the rods 43, 43, are movable vertically in bearings in the bed-plate 10 and are fixed at their lower ends to a cross-bar 44 which has an arm 45 with a stud or roller entering the groove of a cam 46. The shape of the cam is such that the fingers 41, 41, are raised as stated and are held up until the wrapper has been drawn beneath them, when they again drop to the plate. The feed table 40 and plate 68 are placed slightly above the top of the box 38, 39. On the opposite side of the machine, across the box, is supported the mechanism for drawing each wrapper into position across the box to receive the cake from the cake-forming devices above it. To the bed-plate are secured suitable guide-ways 47, 47, in which a frame or carriage 48 may be reciprocated. To the inner end of the frame or carriage are secured fixed fingers 49, 49, and in bearings above them is mounted a shaft 50 to which are rigidly secured corresponding fingers 51, 51. A spring 52 tends to rock the shaft to press the fingers 51, 51, down upon the corresponding fingers 49, 49. An arm 53 is also fixed to the shaft 50 and in the hub of the arm (see Fig. 4) is seated a spring pressed plunger 54 having a rounded or conical head which is adapted to enter a corresponding recess in the side of the adjacent bearing block and thereby to retain the fingers 51 in an elevated position against the stress of the spring 52. In line with the arm 53 and at each end of its stroke with the frame or carriage 48 is placed an adjustable stop-pin 55, 56, so that as the frame is drawn to the left in Fig. 2 the shaft 50 shall be rocked to lift the fingers 51 and to permit the plunger 54 to engage the recess in the bearing block to hold the fingers elevated, while as the frame moves to the extreme right the shaft 50 shall be rocked in the opposite direction to release it from the friction catch and permit the spring 52 to throw the fingers 51 down to seize the edge of a wrapper between themselves and the fingers 49, 49. An arm 57 carries a roller 58 which rests against the periphery of a cam 59 and is itself slotted to straddle a guide-pin 60 which is centrally fixed to the cam or is an extension of the vertical shaft 61 which carries the cam. The said shaft is mounted in suitable bearings 62, 62, fixed to the frame-work of the machine and has a bevel pinion 63 which meshes with an equal bevel pinion 64 on the main shaft 14. The cam 59 may be a grooved cam, or, as shown, it may be a plate cam and the roller of the arm 57 be always held against the cam by springs, or as shown, by weights 65 and cords 66, which pass over a guide pulley 67 and are connected to the under side of the arm. The action of the wrapper feeding mechanism will be apparent from the foregoing description of the parts. During the greater part of each rotation of the main shaft 14 the frame or carriage 48 remains at rest in the position shown in the drawings, but at the proper time with respect to the movements of the other parts of the machine the drop of the cam 59 reaches the roller of the arm 57 and causes or permits the frame 48 to move swiftly across the box 38, 39, and to seize a wrapper with the fingers 49, 51. The incline of the cam then draws the frame back quickly, bringing with it a new wrapper which is laid across the box. As the frame reaches its limit of movement the fingers are opened to leave the wrapper free. It is at this time that the plunger 24, which already may have commenced to move, now completes its downward movement, separates the cake from the material in the chute, pushes it through the yielding doors 32, 32, upon the wrapper which has been placed to receive it, and thrusts it down with the wrapper into the box 38, 39, and there compresses it to an extent determined by the range of movement of the plunger. The plunger is then immediately withdrawn to permit the sides and ends of the wrapper to be folded upon the cake before it is ejected from the box.

The wrapping or wrapper-folding mechanism comprises several parts which operate in succession and these parts will be described in the order in which they operate in the machine illustrated. The sides of the wrapper which, by the depression of the cake into the box 38, 39, are left above the sides of the box are first to be folded down upon the cake. For this purpose two oppositely disposed plates 68 and 69 are mounted to slide in ways 70 (see Figs. 1 and 3) which are supported by the bed-plate 10. The plate 68 is connected by a link 71 (see Figs. 1, 2 and 6) to the end of a lever 72 which is pivoted to a bracket 73 and carries at its other end a roller 74 which bears against a cam 75 (see Figs. 2 and 15) mounted on the main shaft 14. A spring 76, acting upon the lever 72, draws the plate 68 out and keeps the roller 74 in contact with the cam. The plate 69 is connected by a link 77 to a bar 78 (see Figs. 2 and 6) which is slotted to straddle the shaft 61 and has a roller 79 resting against the edge of a cam 80. The latter is fixed to the shaft 61 and therefore moves with the cam 75. The plate 69 is drawn out by the cam 80 and is moved in and its roller held in contact with the cam by a spring 81 which is connected to the under side of the bar 78. The two cams 75 and 80 cause the plates 68 and 69 to move in over the sides of the box 38, 39, and thereby to fold the sides of the wrapper down upon the cake. In practice the two cams are so shaped and related as to cause the front edge of the plate 68 to move somewhat beyond the middle line of the box before the plate 69 meets it and then to retire somewhat as the said plate 69 moves to its full extent. In this manner one side is then laid over it. The two plates 68 and 69 rest in the position last referred to for a short space of time during which the projecting ends of the wrapper are folded in from the sides and up from the bottom. The projecting ends, both front and rear are folded in by four wings 82, 82, 82, 82, (see Figs. 3, 5 and 6,) which are pivoted at the corners of the box 38, 39, and have fixed to each a pinion 83. With each pinion meshes a rack 84 which is free to slide in guides fixed to the bed-plate. The end of each rack-bar is extended downward through a slot in the bed-plate 10 and is connected by a link 85 to a bell-crank 86 which is pivoted upon one or the other of two shafts 87 fixed in brackets on the under side of the bed-plate. The other member of each bell-crank 86 is connected to its respective bar 88, the other end of which is slotted to straddle the main shaft 14 and bears a stud or roller 89 to enter the groove of a corresponding cam 90 which is fixed upon the shaft 14. The four cams 90, 90, 90, 90, are separately shown in Figs. 8, 9, 11 and 12, but as they are exactly alike with their connections they need not be further distinguished in this description. The four cams are so set as to actuate the four wings 82 simultaneously. The next action of the mechanism is to fold up the projecting ends of the wrapper from the bottom. For this purpose a wing 91 (see Figs. 3 and 5) is pivoted or hinged at each end of the bottom 38 of the box 38, 39. These wings are connected each to the upper end of a corresponding bar 92 which rises through a slot in the bed-plate 10. The lower ends of the bars (see Fig. 10) are connected to a cross-bar 93 to which is fixed a bar 94. The latter is slotted to straddle the main shaft 14 and bears a stud or roller 95 to enter the groove of a cam 96 which is fixed to the said shaft 14. The final action of the wrapping mechanism is to fold down from the top the projecting ends of the wrapper. This preferably takes place after the plates 68 and 69 have been withdrawn. The wings 97, 97, which accomplish this are hinged or pivoted to the under side of the tube or chute 16 near the ends of the opening through which the cake and the plunger pass down. Each wing 97 is preferably fixed to a corresponding short shaft 98 (see Figs. 5 and 6) which is mounted in suitable bearings and has an arm 99 fixed to one end. The arms are connected by links 100, 100, to a crank-pin 101 carried by a disk 102 which is mounted upon a stud 103 fixed to the side of the chute 16. A link 104 connects the crank-pin 101 to one arm of a bell-crank 105 which is pivoted upon the bed-plate 10. The other arm of said bell-crank is connected to a bar 106 the other end of which is slotted to straddle the shaft 14 and bears a stud or roller 107 to enter the groove of a cam 108 (see Figs. 2 and 14) which is fixed to the said shaft 14.

The ejector mechanism operates to remove the package from the box 38, 39, when it has been completely inclosed in its wrapper. It comprises a burrer-plate 109 (see Figs. 3 and 15) fixed to the end of a rod 110 which is mounted to slide through guides secured to the bed-plate 10. A link 111 (see Figs. 1 and 3) connects the rod 110 to one end of a lever 112 which is pivoted upon the bed-plate 10 and is acted upon by a spring 113 to draw the ejector back from the box 38, 39. The other end of the lever stands in the path of a pin 114 on the under side of the cam-plate 59. At the proper time in the rotation of the cam the pin 114 moves the lever 112 to thrust the ejector forward somewhat slowly and to push the package from the box 38, 39. As soon as the pin 114 passes the end of the lever 112 the spring 113 acts upon the lever to throw the ejector back quickly.

The sealing devices which are shown in the drawings are designed to act upon a tin-foil wrapper and to secure the folds by melting or softening the tin-foil sufficiently to cause it to adhere. For this purpose gas pipes 115 (see Fig. 5) are so placed as to cause flame to impinge upon the tip of each wing 97 whereby it is kept hot and will, when it presses down the last fold of the wrapper, melt or soften it sufficiently to secure it in place. For the purpose of sealing the loose edge of the wrapper on top of the package the latter is forced by the ejector into the grasp of two rollers one of which, marked 116 (see Figs. 2, 3 and 5) is journaled in an aperture in the bed-plate 10 while the other, 117, (see Figs. 1 and 5) is mounted in bearings 118 above the bed-plate and is rotated by means of a pulley 119, a cord 120 and a pulley 121 on the main-shaft 14. The roller 117 has a circumferential boss 122 in line with the middle of the box 38, 39, and is hollow to receive a gas pipe and burner 123, by which the roller and particularly the boss 122 may be kept hot for the purpose stated.

The operation of the machine as a whole will now be readily understood and will be described briefly. The tobacco or other material or substance to be packaged is fed by hand to the rollers 18 and by them is forced forward in the chute or tube 16. By means of the eccentric gears the rollers are caused to force the material forward rapidly while the plunger 24 is at rest and thereby to crowd it into the end of the chute beneath the plunger, but to feed it very slowly and merely keep the chute full to the line of the plunger while the latter is in motion. At a certain point in the rotation of the main shaft 14 the carriage 47 moves across the box 38, 39, seizes between its fingers a single wrapper and draws it across the box, the stop fingers 41 being raised at the proper time to free the wrapper. The plunger 24 now descends, forces the cake into the box 38, 39, and immediately rises out of the way to permit the plates 68, 69, to be pushed over the box and fold down the sides of the wrapper. The projecting ends of the wrapper are then folded, first in from the sides by the wings 82, and then up from the botton by the wings 91. The plates 68, 69, are then turned or drawn back and the wings fold down the ends of the wrapper from the top and seal them in the manner described. The several wings being immediately withdrawn or turned back after their action the way is clear for the removal of the package which is effected by the ejector 109, which then withdraws and leaves the machine in readiness for the next cycle of operations, the sealing of the top of the package being effected by the roller 117 after its ejection from the box.

It will be obvious that while the several mechanisms are necessary to the complete packaging and sealing of material like tobacco which is fed to the machine in bulk, yet the various mechanisms are susceptible of use in various combinations according to the particular character of the work to be done in each case. Various mechanical changes in the several mechanisms will also suggest themselves as within the scope of the invention, as for example the substitution for the sliding plates 68, 69, of plates hinged to the sides 39 and turned to fold down the wrapper by rack and pinion mechanism like that shown for operating the wings 82.

The selection of the particular devices to be employed in any case will be governed by the nature of the work to be done.

I claim as my invention—

1. The combination with a feed tube and a plunger working transversely through said tube at one end, of feed rolls at the other end of said tube, an eccentric gearing for driving said rolls at a varying speed, substantially as shown and described.

2. The combination with a feed tube, a plunger working transversely through said tube at one end, a main-shaft and a cam driven by said plunger, of feed rolls at the other end of said tube and eccentric gearing between said shaft and said rolls to drive the latter at a varying speed, substantially as shown and described.

3. The combination with a feed tube having its sides cut away to form opposite apertures, feed rolls to force the material through said tube, and eccentric gears for driving said rolls with varying speed, of a plunger fitting snugly in said apertures, means to actuate the plunger to sever a portion of the material from that in the tube and to force it from the same, spring supported doors to close the aperture toward which the plunger moves, and an open box into which the material is forced by the plunger, substantially as shown and described.

4. The combination with a feed tube having an aperture in its side through which the material may be delivered, and a yielding door to close said aperture, of a plate disposed transversely in said tube and supported by a spring to yield longitudinally in the tube as the material is fed into the same, substantially as shown and described.

5. The combination with a feed tube and a plunger working transversely through said tube, of a plate disposed transversely in said tube and supported to yield longitudinally in the tube as the material is fed into the same, and a box below said tube and in line with the plunger to receive the material as it is forced out from the tube by the plunger, substantially shown and described.

6. The combination with a feed tube having its sides cut away to form opposite apertures, means to force material through said tube, a plunger working transversely through the tube, and a yielding door to close the aperture toward which the plunger moves, of a table to support wrappers, ways secured in a plane parallel with that of the feed tube, a carriage mounted on said ways and having fingers to seize a wrapper and means to reciprocate said carriage beneath the tube to lay a wrapper beneath the plunger to receive the material forced from the tube by the plunger, substantially as shown and described.

7. The combination with a feed tube having its sides cut away to form opposite apertures, means to feed the material through said tube, a plunger working transversely through said tube to sever a portion of the material, a yielding plate closing the aperture toward which the plunger moves, and a stationary box disposed below the tube and in line with the apertures to receive the material from the tube, of wrapper feeding mechanism to lay a wrapper across the box, ways secured in a plane between the top of the box and the tube, plates sliding in said ways, and means to move said plates together over the box, substantially as shown and described.

8. The combination with a feed tube, and a plunger working transversely through said tube, of a box with open top and sides fixed below said tube and in line with the plunger to receive the material forced down by the plunger, wrapper feeding mechanism to lay a wrapper across the box means to fold the sides of the wrapper down upon the package and wings pivoted at the corners of said box and means to swing said wings on their pivots to turn the projecting ends of the wrapper in from the sides, substantially as shown and described.

9. The combination with a feed tube, and a plunger working transversely through said tube, of a box with open top and sides fixed below the tube and in line with the plunger to receive the material forced down by the plunger, wrapper feeding mechanism to lay a wrapper across the box, means to fold the sides of the wrapper down upon the package, means to turn the projecting ends of the wrapper in from the sides, wings pivoted at each end of the bottom of the box, wings pivoted at the under side of the feed tube in line with the other wings, and means to swing said wings on their pivots to turn the protecting ends of the wrapper up and down, substantially as shown and described.

10. The combination with an open box to receive a wrapper and the material to be wrapped, of wings to fold in the projecting ends of the wrapper, means to move said wings, and means to heat said wings to cause them to seal the wrapper, substantially as shown and described.

11. The combination with mechanism for folding the sides of a wrapper down upon the package, an ejector to force the package from the folding mechanism, a roller journaled loosely in bearings above the bed-plate and beneath and in contact with which the package is passed from the folding mechanism, and means to heat the roller to cause it to seal the wrapper, substantially as shown and described.

12. The combination with an open box to receive a wrapper and the material to be wrapped, means to fold the sides of the wrapper down upon the package, an ejector to force the package from the box, a roller journaled loosely in bearings above the bed-plate and beneath and in contact with which the package is passed from the folding mechanism, means to rotate said roller and means to heat said roller to cause it to seal the wrapper, substantially as shown and described.

In testimony whereof I have signed my name to this specification in the presence of two subscribing witnesses.

JOHN S. VOITEK.

Witnesses:
A. N. JESBERA,
A. WIDDER.